(12) United States Patent
Takeo et al.

(10) Patent No.: US 9,139,693 B2
(45) Date of Patent: Sep. 22, 2015

(54) POLYETHER POLYAMIDE ELASTOMER

(75) Inventors: Mayumi Takeo, Kanagawa (JP); Tomonori Katou, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 1 day.

(21) Appl. No.: 13/985,445

(22) PCT Filed: Feb. 13, 2012

(86) PCT No.: PCT/JP2012/053312
§ 371 (c)(1), (2), (4) Date: Aug. 14, 2013

(87) PCT Pub. No.: WO2012/111636
PCT Pub. Date: Aug. 23, 2012

(65) Prior Publication Data
US 2013/0324695 A1 Dec. 5, 2013

(30) Foreign Application Priority Data

Feb. 14, 2011 (JP) .................................. 2011-028316
Mar. 3, 2011 (JP) .................................. 2011-046330
Dec. 26, 2011 (JP) .................................. 2011-283437

(51) Int. Cl.
*C08G 69/40* (2006.01)
*C08G 69/26* (2006.01)
*C08G 18/32* (2006.01)
*C08G 18/28* (2006.01)

(52) U.S. Cl.
CPC ............ *C08G 69/265* (2013.01); *C08G 18/283* (2013.01); *C08G 18/324* (2013.01); *C08G 69/40* (2013.01)

(58) Field of Classification Search
CPC ....... C08L 77/02; C08L 77/06; C08G 59/502; C08G 69/40; C08G 73/1046; C08G 18/283; C08G 18/324

USPC .................................................. 528/310, 335
See application file for complete search history.

(56) References Cited

U.S. PATENT DOCUMENTS

| 3,946,089 A | * | 3/1976 | Furukawa et al. ............ 525/408 |
| 4,218,351 A | | 8/1980 | Rasmussen |
| 5,128,441 A | * | 7/1992 | Speranza et al. ............. 528/335 |
| 5,744,570 A | | 4/1998 | Gebben |

FOREIGN PATENT DOCUMENTS

| JP | 49-110744 | 10/1974 |
| JP | 1-193320 | 8/1989 |
| JP | 9-118750 | 5/1997 |
| JP | 2004-161964 | 6/2004 |
| JP | 2004-346274 | 12/2004 |
| TW | 200604281 | 2/2006 |
| TW | 200936643 | 9/2009 |
| WO | WO 2006/001136 | 1/2006 |
| WO | WO 2009/057805 | 5/2009 |

OTHER PUBLICATIONS

U.S. Appl. No. 13/985,463, filed Aug. 14, 2013, Takeo, et al.
International Search Report issued May 15, 2012 in Application No. PCT/JP2012/053312.
Office Action issued May 18, 2015, in corresponding Taiwan Patent Application No. 10420635650.

* cited by examiner

*Primary Examiner* — Gregory Listvoyb
(74) *Attorney, Agent, or Firm* — Oblon, McClelland, Maier & Neustadt, L.L.P.

(57) ABSTRACT

Provided is a polyether polyamide elastomer not only having excellent melt moldability, crystallinity and flexibility but having heat resistance. The polyether polyamide elastomer includes a diamine constituent unit derived from a polyether diamine compound (A-1) and a xylylenediamine (A-2) and a dicarboxylic acid constituent unit derived from an α,ω-linear aliphatic dicarboxylic acid having a carbon number of from 4 to 20.

20 Claims, No Drawings

POLYETHER POLYAMIDE ELASTOMER

CROSS REFERENCE TO RELATED APPLICATIONS

The present application is a 35 U.S.C. §371 national stage patent application of International patent application PCT/JP2012/053312, filed on Feb. 13, 2012, published as WO/2012/111636 on Aug. 23, 2012, the text of which is incorporated by reference, and claims the benefit of the filing date of Japanese application nos. 2011-028316, filed on Feb. 14, 2011; 2011-046330, filed on Mar. 3, 2011; and 2011-283437, filed on Dec. 26, 2011, the text of each of which is also incorporated by reference.

TECHNICAL FIELD

The present invention relates to a polyether polyamide elastomer having heat resistance, crystallinity, and flexibility.

BACKGROUND ART

Rubbers having a chemical crosslinking point by vulcanization cannot be recycled and have a high specific gravity. On the other hand, thermoplastic elastomers are composed of a phase separation structure containing a physical crosslinking point by crystallization or the like as a hard segment and an amorphous portion as a soft segment, so that the thermoplastic elastomers have such characteristic features that they are easily subjected to melt molding processing, are able to be recycled, and have a low specific gravity. Accordingly, the thermoplastic elastomers are watched in the fields of automobile parts, electric and electronic parts, sporting goods, and the like.

As the thermoplastic elastomers, there are developed a variety of thermoplastic elastomers such as polyolefin-based, polyurethane-based, polyester-based, polyamide-based, polystyrene-based, or polyvinyl chloride-based thermoplastic elastomers, etc. Of these, polyurethane-based, polyester-based, and polyamide-based thermoplastic elastomers are known as an elastomer having relatively excellent heat resistance.

Above all, polyamide elastomers are excellent in terms of flexibility, low specific gravity, friction resistance and abrasion resistance properties, elasticity, bending fatigue resistance, low-temperature properties, molding processability, and chemical resistance, so that they are widely used as materials of tubes, hoses, sporting goods, seal packings, and automobile or electric and electronic parts.

As the polyamide elastomers, there are known polyether polyamide elastomers containing a polyamide block as a hard segment and a polyether block as a soft segment, and the like. As examples thereof, Patent Documents 1 and 2 disclose polyether polyamide elastomers based on an aliphatic polyamide such as polyamide 12, etc.

CITATION LIST

Patent Literature

[Patent Document 1]: JP-A-2004-161964
[Patent Document 2]: JP-A-2004-346274

SUMMARY OF INVENTION

Technical Problem

As for the above-described polyether polyamide elastomers, aliphatic polyamides such as polyamide 12, etc. are utilized as a polyamide component thereof. However, since the polyamide component has a low melting point, such polyether polyamide elastomers are insufficient in terms of heat resistance in applications for which they are utilized in a high-temperature environment.

The problem to be solved by the present invention is to provide a heat-resistant polyether polyamide elastomer which is suitable for materials of automobile or electric and electronic parts further requiring heat resistance, while keeping melt moldability, toughness, flexibility, and rubbery properties of polyamide elastomers.

Solution to Problem

In order to solve the foregoing problem, the present inventors made extensive and intensive investigations. As a result, it has been found that the foregoing object can be achieved by a polyether polyamide elastomer including a diamine constituent unit derived from a specified polyether diamine compound and a xylylenediamine and a dicarboxylic acid constituent unit derived from an α,ω-linear aliphatic dicarboxylic acid having a carbon number of from 4 to 20, leading to accomplishment of the present invention.

Specifically, according to the present invention, a polyether polyamide elastomer including a diamine constituent unit derived from a polyether diamine compound (A-1) represented by the following formula (1) and a xylylenediamine (A-2) and a dicarboxylic acid constituent unit derived from an α,ω-linear aliphatic dicarboxylic acid having a carbon number of from 4 to 20, is provided.

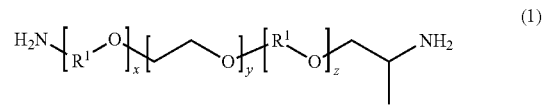

(1)

(In the formula (1), (x+z) represents a numerical value of from 1 to 60; y represents a numerical value of from 1 to 50; and $R^1$ represents a propylene group.)

Furthermore, preferred embodiments of the polyether polyamide elastomer of the present invention are as follows.

1. The xylylenediamine (A-2) is m-xylylenediamine, p-xylylenediamine, or a mixture thereof.

2. The α,ω-linear aliphatic dicarboxylic acid having a carbon number of from 4 to 20 is at least one member selected from the group consisting of adipic acid and sebacic acid.

3. A proportion of the constituent unit derived from the xylylenediamine (A-2) in the diamine constituent unit is in the range of from 50 to 99.9% by mole.

4. A relative viscosity of the polyether polyamide elastomer is from 1.1 to 3.0.

5. A melting point of the polyether polyamide elastomer is from 170 to 270° C.

6. A rate of tensile elongation at break of the polyether polyamide elastomer at a measurement temperature of 23° C. and a humidity of 50% RH is 100% or more.

The polyether polyamide elastomer of the present invention has higher crystallinity and heat resistance, while keeping melt moldability, flexibility, and rubbery properties of existent polyether polyamide elastomers, and is suitable for materials of automobile or electric and electronic parts requiring high heat resistance.

DESCRIPTION OF EMBODIMENTS

Polyether Polyamide Elastomer

The polyether polyamide elastomer of the present invention comprises a diamine constituent unit derived from a polyether diamine compound (A-1) represented by the following formula (1) and a xylylenediamine (A-2) and a dicarboxylic acid constituent unit derived from an α,ω-linear aliphatic dicarboxylic acid having a carbon number of from 4 to 20.

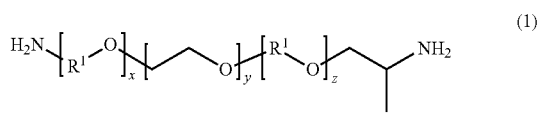

(In the formula (1), (x+z) represents a numerical value of from 1 to 60; y represents a numerical value of from 1 to 50; and $R^1$ represents a propylene group.)

The diamine constituent unit that constitutes the polyether polyamide elastomer of the present invention is derived from a polyether diamine compound (A-1) represented by the formula (1) and a xylylenediamine (A-2).

(Polyether Diamine Compound (A-1))

The diamine constituent unit that constitutes the polyether polyamide elastomer of the present invention includes a constituent unit derived from a polyether diamine compound (A-1) represented by the formula (1). In the polyether diamine compound (A-1) which is used in the present invention, the numerical value of (x+z) in the foregoing formula (1) is from 1 to 60, preferably from 2 to 40, more preferably from 2 to 30, and still more preferably from 2 to 20; and the numerical value of y is from 1 to 50, preferably from 1 to 40, more preferably from 1 to 30, and still more preferably from 1 to 20. In the case where the values of x, y, and z are larger than the foregoing ranges, the compatibility with an oligomer or polymer composed of a xylylenediamine and a dicarboxylic acid, which is produced on the way of a reaction of melt polymerization, becomes low, so that the polymerization reaction proceeds hardly.

In addition, in the foregoing formula (1), all of $R^1$s represent a propylene group.

A weight average molecular weight of the polyether diamine compound (A-1) is preferably from 100 to 6,000, more preferably from 200 to 4,000, still more preferably from 200 to 3,000, and yet still more preferably from 200 to 2,000. So long as the average molecular weight of the polyether diamine compound falls within the foregoing range, a polymer that reveals functions as an elastomer, such as flexibility, rubber elasticity, etc., can be obtained.

(Xylylenediamine (A-2))

The diamine constituent unit that constitutes the polyether polyamide elastomer of the present invention includes a constituent unit derived from a xylylenediamine (A-2). The xylylenediamine (A-2) that constitutes the diamine constituent unit of the present invention is preferably m-xylylenediamine, p-xylylenediamine, or a mixture thereof, and more preferably m-xylylenediamine or a mixture of m-xylylenediamine and p-xylylenediamine.

In the case where the xylylenediamine (A-2) that constitutes the diamine constituent unit is derived from m-xylylenediamine, the resulting polyether polyamide elastomer may become a polyether polyamide elastomer which is excellent in terms of flexibility, crystallinity, melt moldability, molding processability, and toughness.

In the case where the xylylenediamine (A-2) that constitutes the diamine constituent unit is derived from a mixture of m-xylylenediamine and p-xylylenediamine, the resulting polyether polyamide elastomer may become a polyether polyamide elastomer which is excellent in terms of flexibility, crystallinity, melt moldability, molding processability, and toughness and furthermore, exhibits high heat resistance and high elastic modulus.

In the case where a mixture of m-xylylenediamine and p-xylylenediamine is used as the xylylenediamine (A-2) that constitutes the diamine constituent unit, a proportion of the p-xylylenediamine relative to a total amount of m-xylylenediamine and p-xylylenediamine is preferably not more than 90% by mole, more preferably from 1 to 80% by mole, and still more preferably from 5 to 70% by mole. So long as the proportion of p-xylylenediamine falls within the foregoing range, a melting point of the resulting polyether polyamide elastomer is not close to a decomposition temperature of the polyether polyamide elastomer, and hence, such is preferable.

A proportion of the constituent unit derived from the xylylenediamine (A-2) in the diamine constituent unit, namely a proportion of the xylylenediamine (A-2) relative to a total amount of the polyether diamine compound (A-1) and the xylylenediamine (A-2), both of which constitute the diamine constituent unit, is preferably from 50 to 99.9% by mole, more preferably from 50 to 99.5% by mole, and still more preferably from 50 to 99% by mole. So long as the proportion of the constituent unit derived from the xylylenediamine (A-2) in the diamine constituent unit falls within the foregoing range, the resulting polyether polyamide elastomer is excellent in terms of melt moldability and furthermore, is excellent in terms of mechanical physical properties such as strength, elastic modulus, etc.

As described previously, though the diamine constituent unit that constitutes the polyether polyamide elastomer of the present invention is derived from the polyether diamine compound (A-1) represented by the foregoing formula (1) and the xylylenediamine (A-2), so long as the effects of the present invention are not hindered, another diamine compound may be copolymerized therewith.

Examples of the diamine compound other than the polyether diamine compound (A-1) and the xylylenediamine (A-2), which may constitute the diamine constituent unit, include aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine, 2,4,4-trimethylhexamethylenediamine, etc.; alicyclic diamines such as 1,3-diaminocyclohexane, 1,4-diaminocyclohexane, bis(4-aminocyclohexyl)methane, 2,2-bis(4-aminocyclohexyl)propane, bis(aminomethyl)decalin, bis(aminomethyl)tricyclodecane, etc.; aromatic ring-containing diamines such as bis(4-aminophenyl)ether, p-phenylenediamine, bis(aminomethyl)naphthalene, etc.; and the like. However, the diamine compound is not limited to these examples.

(Dicarboxylic Acid Constituent Unit)

The dicarboxylic acid constituent unit that constitutes the polyether polyamide elastomer of the present invention is derived from an α,ω-linear aliphatic dicarboxylic acid having a carbon number of from 4 to 20. Examples of the α,ω-linear aliphatic dicarboxylic acid having a carbon number of from 4 to 20 include succinic acid, glutaric acid, adipic acid, pimelic acid, suberic acid, azelaic acid, sebacic acid, 1,10-decanedicarboxylic acid, 1,11-undecanedicarboxylic acid, 1,12-dodecanedicarboxylic acid, and the like. Of these, at least one member selected from the group consisting of adipic acid and sebacic acid is preferably used from the viewpoints of crystallinity and high elasticity. These dicarboxylic acids may be used solely or in combination of two or more kinds thereof.

When the polyether polyamide elastomer of the present invention contains, as a hard segment, a highly crystalline polyamide block formed of the xylylenediamine (A-2) and the α,ω-linear aliphatic dicarboxylic acid having a carbon number of from 4 to 20 and, as a soft segment, a polyether block derived from the polyether diamine compound (A-1), it is excellent in terms of melt moldability and molding processability.

Furthermore, the resulting polyether polyamide elastomer is excellent in terms of toughness, flexibility, crystallinity, heat resistance, and the like.

A relative viscosity of the polyether polyamide elastomer of the present invention is measured by a method as described later. From the viewpoints of moldability and melt mixing properties with another resin, the relative viscosity is preferably in the range of from 1.1 to 3.0, more preferably in the range of from 1.1 to 2.9, and still more preferably in the range of from 1.1 to 2.8.

A melting point of the polyether polyamide elastomer of the present invention is measured by a method as described later, and it is preferably in the range of from 170 to 270° C., more preferably in the range of from 175 to 270° C., still more preferably in the range of from 180 to 270° C., and yet still more preferably in the range of from 180 to 260° C. When the melting point falls within the foregoing range, a polyether polyamide elastomer having excellent heat resistance is revealed.

A rate of tensile elongation at break of the polyether polyamide elastomer of the present invention (measurement temperature: 23° C., humidity: 50% RH) is preferably 100% or more, more preferably 200% or more, still more preferably 250% or more, and yet still more preferably 300% or more. When the rate of tensile elongation at break is 100% or more, an elastomer having more excellent flexibility is revealed.

A tensile elastic modulus of the polyether polyamide elastomer of the present invention (measurement temperature: 23° C., humidity: 50% RH) is preferably 100 MPa or more, more preferably 200 MPa or more, still more preferably 300 MPa or more, yet still more preferably 400 MPa or more, and especially preferably 500 MPa or more. When the tensile elastic modulus is 100 MPa or more, a polyether polyamide elastomer having flexibility and simultaneously having excellent mechanical strength is revealed.

A molar ratio of the diamine component (the diamine including the polyether diamine compound (A-1), the xylylenediamine (A-2), and the like) and the dicarboxylic acid component (the dicarboxylic acid including the α,ω-linear aliphatic dicarboxylic acid having a carbon number of from 4 to 20 and the like) ((diamine component)/(dicarboxylic acid component)) is preferably in the range of from 0.9 to 1.1, more preferably in the range of from 0.93 to 1.07, still more preferably in the range of from 0.95 to 1.05, and especially preferably in the range of from 0.97 to 1.02. When the molar ratio falls within the foregoing range, an increase of the molecular weight is easily advanced.

The manufacture of the polyether polyamide elastomer of the present invention is not particularly limited but can be performed by an arbitrary method under an arbitrary polymerization condition. For example, the polyether polyamide elastomer can be manufactured by a method in which a salt composed of a diamine component (e.g., a xylylenediamine, a polyether diamine, etc.) and a dicarboxylic acid component (e.g., adipic acid, sebacic acid, etc.) is subjected to temperature rise in the presence of water in a pressurized state and polymerized in a molten state while removing added water and condensed water. In addition, the polyether polyamide elastomer can also be manufactured by a method in which a diamine component (e.g., a xylylenediamine, a polyether diamine, etc.) is added directly to a dicarboxylic acid component (e.g., adipic acid, sebacic acid, etc.) in a molten state, and the mixture is polycondensed at atmospheric pressure. In that case, in order to keep the reaction system in a uniform liquid state, the diamine component is continuously added to the dicarboxylic acid component, and meanwhile, the polycondensation is advanced while subjecting the reaction system to temperature rise such that the reaction temperature does not fall below the melting point of the produced oligoamide or polyamide.

The polymerization can be performed at a temperature of preferably from 150 to 300° C., more preferably from 160 to 280° C., and still more preferably from 170 to 270° C. So long as the polymerization temperature falls within the foregoing range, the polymerization reaction is rapidly advanced. In addition, since the monomers or the oligomer or polymer, etc. on the way of the polymerization hardly causes heat decomposition, properties of the resulting polymer become favorable.

The manufacture of the polyether polyamide elastomer of the present invention can be in general performed for a polymerization time of from 1 to 5 hours. When the polymerization time is allowed to fall within the foregoing range, the molecular weight of the polyether polyamide elastomer can be sufficiently increased, and furthermore, coloration of the resulting polymer is suppressed. Thus, a polyether polyamide elastomer having desired physical properties can be obtained.

It is preferable that the polyether polyamide elastomer of the present invention is manufactured by a melt polycondensation (melt polymerization) method upon addition of a phosphorus atom-containing compound. The melt polycondensation method is preferably a method in which the diamine component is added dropwise to the dicarboxylic acid component having been melted at atmospheric pressure, and the mixture is polymerized in a molten state while removing condensed water.

In the polycondensation system of the polyether polyamide elastomer of the present invention, a phosphorus atom-containing compound can be added within the range where its properties are not hindered. Examples of the phosphorus atom-containing compound which can be added include dimethylphosphinic acid, phenylmethylphosphinic acid, hypophosphorous acid, sodium hypophosphite, potassium hypophosphite, lithium hypophosphite, ethyl hypophosphite, phenylphosphonous acid, sodium phenylphosphonoate, potassium phenylphosphonoate, lithium phenylphosphonoate, ethyl phenylphosphonoate, phenylphosphonic acid, ethyl phosphonic acid, sodium phenylphosphonate, potassium phenylphosphonate, lithium phenylphosphonate, diethyl phenylphosphonate, sodium ethylphosphonate, potassium ethylphosphonate, phosphorous acid, sodium hydrogen phosphite, sodium phosphite, triethyl phosphite, triphenyl phosphite, pyrrophosphorous acid, and the like. Of these, in particular, hypophosphorous acid metal salts such as sodium hypophosphite, potassium hypophosphite, lithium hypophosphite, etc. are preferably used because they are high in terms of an effect for promoting the amidation reaction and also excellent in terms of a coloration preventing effect, with sodium hypophosphite being especially preferable. The phosphorus atom-containing compound which can be used in the present invention is not limited to these compounds. The addition amount of the phosphorus atom-containing compound which is added to the polycondensation system is preferably from 1 to 1,000 ppm, more preferably from 5 to 1,000 ppm, and still more preferably from 10 to 1,000 ppm in terms of a concentration of the phosphorus atom in the polyether polyamide elastomer. When the concentration of the phosphorus atom in the polyether polyamide elastomer is from 1 to 1,000 ppm, a polyether polyamide elastomer having a good appearance and also having excellent molding processability can be obtained.

In addition, it is preferable to add an alkali metal compound in combination with the phosphorus atom-containing compound to the polycondensation system of the polyether polyamide elastomer of the present invention. In order to prevent the coloration of the polymer during the polycondensation from occurring, it is necessary to allow a sufficient amount of the phosphorus atom-containing compound to exist. Under certain circumstances, there is a concern that gelation of the polymer is caused. Thus, in order to also adjust an amidation reaction rate, it is preferable to allow an alkali metal compound to coexist. As the alkali metal compound, alkali metal hydroxides and alkali metal acetates are preferable. Examples of the alkali metal compound which can be used in the present invention include lithium hydroxide, sodium hydroxide, potassium hydroxide, rubidium hydroxide, cesium hydroxide, lithium acetate, sodium acetate, potassium acetate, rubidium acetate, cesium acetate, and the like. However, the alkali metal compound can be used without being limited to these compounds. In the case of adding the alkali metal compound to the polycondensation system, a value obtained by dividing the molar number of the compound by the molar number of the phosphorus atom-containing compound is regulated to preferably from 0.5 to 1, more preferably from 0.55 to 0.95, and still more preferably from 0.6 to 0.9. When the subject value falls within the foregoing range, an effect for suppressing the promotion of the amidation reaction of the phosphorus atom-containing compound is appropriate. In consequence, the occurrence of the matter that the polycondensation reaction rate is lowered due to excessive suppression, so that thermal history of the polymer increases, thereby causing an increase of gelation of the polymer can be avoided.

A sulfur atom concentration of the polyether polyamide elastomer of the present invention is from 1 to 200 ppm, more preferably from 10 to 150 ppm, and still more preferably from 20 to 100 ppm. When the sulfur atom concentration falls within the foregoing range, not only an increase of yellowness (YI value) of the polyether polyamide elastomer at the time of manufacture can be suppressed, but an increase of the YI value at the time of melt molding the polyether polyamide elastomer can be suppressed, thereby making it possible to suppress the YI value of the resulting molded article at a low level.

Furthermore, in the present invention, in the case of using sebacic acid as the dicarboxylic acid, its sulfur atom concentration is preferably from 1 to 500 ppm, more preferably from 1 to 200 ppm, still more preferably from 10 to 150 ppm, and especially preferably from 20 to 100 ppm. When the sulfur atom concentration falls within the foregoing range, an increase of the YI value at the time of synthesizing the polyether polyamide elastomer can be suppressed. In addition, an increase of the YI value at the time of melt molding the polyether polyamide elastomer can be suppressed, thereby making it possible to suppress the YI value of the resulting molded article at a low level.

Similarly, in the present invention, in the case of using sebacic acid as the dicarboxylic acid, its sodium atom concentration is preferably from 1 to 500 ppm, more preferably from 10 to 300 ppm, and still more preferably from 20 to 200 ppm. When the sodium atom concentration falls within the foregoing range, the reactivity at the time of synthesizing the polyether polyamide elastomer is good, the molecular weight can be easily controlled to an appropriate range, and furthermore, the use amount of the alkali metal compound which is blended for the purpose of adjusting the amidation reaction rate as described above can be made small. In addition, an increase of the viscosity at the time of melt molding the polyether polyamide elastomer can be suppressed, and not only the moldability becomes favorable, but the generation of scorch at the time of molding processing can be suppressed. Thus, the quality of the resulting molded article tends to become favorable.

Such sebacic acid is preferably plant-derived sebacic acid. In view of the fact that the plant-derived sebacic acid contains sulfur compounds or sodium compounds as impurities, the polyether polyamide elastomer containing, as a constituent unit, a unit derived from plant-derived sebacic acid is low in terms of the YI value even when an antioxidant is not added, and the YI value of the resulting molded article is also low. In addition, it is preferable to use the plant-derived sebacic acid without excessively purifying the impurities. Since it is not necessary to excessively purify the impurities, such is advantageous from the standpoint of costs.

In the case of the plant-derived sebacic acid, its purity is preferably from 99 to 100% by mass, more preferably from 99.5 to 100% by mass, and still more preferably from 99.6 to 100% by mass. When the purity falls within this range, the quality of the resulting polyether polyamide elastomer is good, so that the polymerization is not affected, and hence, such is preferable.

For example, the amount of a dicarboxylic acid which the sebacic acid contains, such as 1,10-decamethylenedicarboxylic acid, etc., is preferably from 0 to 1% by mass, more preferably from 0 to 0.7% by mass, and still more preferably from 0 to 0.6% by mass. When the amount of the dicarboxylic acid falls within this range, the quality of the resulting polyether polyamide elastomer is good, so that the polymerization is not affected, and hence, such is preferable.

In addition, the amount of a monocarboxylic acid which the sebacic acid contains, such as octanoic acid, nonanoic acid, undecanoic acid, etc., is preferably from 0 to 1% by mass, more preferably from 0 to 0.5% by mass, and still more preferably from 0 to 0.4% by mass. When the amount of the monocarboxylic acid falls within this range, the quality of the resulting polyether polyamide elastomer is good, so that the polymerization is not affected, and hence, such is preferable.

A hue (APHA) of the sebacic acid is preferably not more than 100, more preferably not more than 75, and still more preferably not more than 50. When the hue falls within this range, the YI value of the resulting polyether polyamide elastomer is low, and hence, such is preferable. Incidentally, the APHA can be measured in conformity with the Standard Methods for the Analysis of Fats, Oils and Related Materials by the Japan Oil Chemists' Society.

The polyether polyamide elastomer of the present invention obtained by the melt polycondensation is once taken out, pelletized, and then dried for use. In addition, for the purpose of further increasing the degree of polymerization, solid phase polymerization may also be performed. As a heating apparatus which is used for drying or solid phase polymerization, a continuous heat drying apparatus, a rotary drum type heating apparatus called, for example, a tumble dryer, a conical dryer, a rotary dryer, etc., or a cone type heating apparatus equipped with a rotary blade in the inside thereof, called a Nauta mixer, can be suitably used. However, known methods and apparatuses can be used without being limited thereto.

To the polyether polyamide elastomer of the present invention, additives such as a matting agent, a heat resistant stabilizer, a weather resistant stabilizer, an ultraviolet ray absorber, a nucleating agent, a plasticizer, a flame retarder, an antistatic agent, a coloration preventive, a gelation preventive, etc. can be added as the need arises within the range where the effects thereof are not hindered.

The polyether polyamide elastomer of the present invention may also be blended with a thermoplastic resin such as a polyamide resin, a polyester resin, a polyolefin resin, etc., and impact resistance, elasticity, flexibility, and the like of such a resin can be improved.

As the polyamide resin, polycaproamide (nylon 6), polyundecanamide (nylon 11), polydodecanamide (nylon 12), polytetramethylene adipamide (nylon 46), polyhexamethylene adipamide (nylon 66), polyhexamethylene azelamide (nylon 69), polyhexamethylene sebacamide (nylon 610), polyundecamethylene adipamide (nylon 116), polyhexamethylene dodecamide (nylon 612), polyhexamethylene terephthalamide (nylon 6T (T represents a terephthalic acid component unit, hereinafter the same), polyhexamethylene isophthalamide (nylon 6I (I represents an isophthalic acid component unit, hereinafter the same), polyhexamethylene terephthal/isophthalamide (nylon 6TI), polyheptamethylene terephthalamide (nylon 9T), poly-m-xylylene adipamide (nylon MXD6 (MXD represents an m-xylylene diamine component unit, hereinafter the same)), poly-m-xylylene sebacamide (nylon MXD 10), poly-p-xylylene sebacamide (nylon PXD10 (PXD represents a p-xylylene diamine component unit)), a polyamide resin (nylon 1,3-/1,4-BAC6 (BAC represents a bis(aminomethyl)cyclohexane component unit) obtained by polycondensation of 1,3- or 1,4-bis(aminomethyl)cyclohexane and adipic acid, and copolymer amides thereof, and the like can be used.

Examples of the polyester resin include a polyethylene terephthalate resin, a polyethylene terephthalate-isophthalate copolymer resin, a polyethylene-1,4-cyclohexane dimethylene-terephthalate copolymer resin, a polyethylene-2,6-naphthalene dicarboxylate resin, a polyethylene-2,6-naphthalene dicarboxylate-terephthalate copolymer resin, a polyethyleneterephthalate-4,4'-biphenyl dicarboxylate copolymer resin, a poly-1,3-propylene-terephthalate resin, a polybutylene terephthalate resin, a polybutylene-2,6-naphthalene dicarboxylate resin, and the like. Examples of the more preferred polyester resin include a polyethylene terephthalate resin, a polyethylene terephthalate-isophthalate copolymer resin, a polybutylene terephthalate resin, and a polyethylene-2,6-naphthalene dicarboxylate resin.

Examples of the polyolefin resin include polyethylenes such as low density polyethylene (LDPE), linear low density polyethylene (LLDPE), very low density polyethylene (VLDPE), medium density polyethylene (MDPE), high density polyethylene (HDPE), etc.; polypropylenes such as a propylene homopolymer, a random or block copolymer of propylene and ethylene or an α-olefin, etc.; mixtures of two or more kinds thereof; and the like. A majority of the polyethylenes is a copolymer of ethylene and an α-olefin. In addition, the polyolefin resin includes a modified polyolefin resin modified with a small amount of a carboxyl group-containing monomer such as acrylic acid, maleic acid, methacrylic acid, maleic anhydride, fumaric acid, itaconic acid, etc. The modification is in general performed by means of copolymerization or graft modification.

By utilizing the polyether polyamide elastomer of the present invention for at least a part of a thermoplastic resin such as a polyamide resin, a polyester resin, a polyolefin resin, etc., a molded article which is excellent in terms of toughness, flexibility, and impact resistance can be obtained by a molding method such as injection molding, extrusion molding, blow molding, etc.

EXAMPLES

Measurement of Physical Properties, Molding, and Evaluation Method

The present invention is specifically described below by reference to the following Examples and Comparative Examples. Incidentally, in the present invention, the measurement for evaluation was performed by the following methods.

1) Relative Viscosity ($\eta r$)

0.2 g of a sample was accurately weighed and dissolved in 20 mL of 96% sulfuric acid at from 20 to 30° C. with stirring. After completely dissolving, 5 mL of the solution was rapidly taken into a Cannon-Fenske viscometer, allowed to stand in a thermostat at 25° C. for 10 minutes, and then measured for a fall time (t). In addition, a fall time (t0) of the 96% sulfuric acid itself was similarly measured. A relative viscosity was calculated from t and t0 according to the following equation (1).

$$\text{Relative viscosity} = t/t0 \quad (1)$$

2) Number Average Molecular Weight (Mn)

First of all, a sample was dissolved in a phenol/ethanol mixed solvent and a benzyl alcohol solvent, respectively, and a terminal carboxyl group concentration and a terminal amino group concentration were determined by means of neutralization titration in hydrochloric acid and a sodium hydroxide aqueous solution, respectively. A number average molecular weight was determined from quantitative values of the terminal amino group concentration and the terminal carboxyl group concentration according to the following equation.

$$\text{Number average molecular weight} = 2 \times 1{,}000{,}000 / ([\text{NH2}] + [\text{COOH}])$$

[NH2]: Terminal amino group concentration (μeq/g)
[COOH]: Terminal carboxyl group concentration (μeq/g)

3) Differential Scanning Calorimetry (Glass Transition Temperature, Crystallization Temperature, and Melting Point)

The measurement was performed in conformity with JIS K-7121 and K-7122. Using DSC-60, available from Shimadzu Corporation, each sample was charged in a DSC measurement pan and subjected to a pre-treatment of raising the temperature to 300° C. in a nitrogen atmosphere at a temperature rise rate of 10° C./min and rapid cooling, followed by performing the measurement. As for the measurement condition, the temperature was raised at a rate of 10° C./min, and after keeping at 300° C. for 5 minutes, the temperature was dropped to 100° C. at a rate of −5° C./min. Thus, a glass transition temperature (Tg), a crystallization temperature (Tch), and a melting point (Tm) were determined.

4) Tensile Test (Tensile Elastic Modulus and Rate of Tensile Elongation at Break):

The tensile test was performed in conformity with JIS K-7161. A fabricated film having a thickness of about 100 μm was cut out in size of 10 mm×100 mm to prepare a test piece. The tensile test was carried out using a strograph, available from Toyo Seiki Seisaku-sho, Ltd. under conditions at a measurement temperature of 23° C. and a humidity of 50% RH and at a tensile rate of 50 mm/min in a chuck-to-chuck distance of 50 mm, thereby determining a tensile elastic modulus and a rate of tensile elongation at break.

5) Yellowness: Measurement of YI Value

The measurement was performed in conformity with JIS K-7105. A fabricated film having a thickness of about 100 μM was cut out in size of 50 mm×50 mm to prepare a test piece. As a measuring apparatus, a haze measuring apparatus, available from Nippon Denshoku Industries Co., Ltd. (Model: COH-300A) was used.

6) Sulfur Atom Concentration (Unit: ppm)

A dicarboxylic acid or a polyether polyamide elastomer was subjected to tablet molding with a press machine, followed by carrying out a fluorescent X-ray analysis (XRF). A fluorescent X-ray analyzer (ZSX Primus), available from Rigaku Corporation was used, and an Rh vacuum tube (4 kW) was used as a vacuum tube. A polypropylene film was used as a film for analyzer window, and EZ scanning was carried out in an irradiation region of 30 mmϕ in a vacuum atmosphere.

Examples 1-1 to 1-3

Using m-Xylylenediamine as the Xylylenediamine and Adipic Acid as the Dicarboxylic Acid) and Comparative Examples 1-1 to 1-3

Example 1-1

In a reaction vessel having a capacity of about 3 L and equipped with a stirrer, a nitrogen gas inlet, and a condensed water discharge port, 613.83 g of adipic acid, 0.6122 g of sodium hypophosphite monohydrate, and 0.4264 g of sodium acetate were charged, and after thoroughly purging the inside of the vessel with nitrogen, the mixture was melted at 170° C. while feeding a nitrogen gas at a rate of 20 mL/min. A mixed liquid of 542.35 g of m-xylylenediamine (MXDA) (available from Mitsubishi Gas Chemical Company, Inc.) and 188.62 g of a polyether diamine (a trade name: ED-900, available from Huntsman Corporation, USA; according to the brochure of Huntsman Corporation, USA, in the formula (1), the round number of (x+z) is 6.0, and the round number of y is 12.5, and an approximate weight average molecular weight is 900) was added dropwise thereto while gradually raising the temperature to 260° C., and the mixture was polymerized for about 2 hours to obtain a polyether polyamide elastomer: ηr=1.45, [COOH]=77.82 μeq/g, [NH2]=51.63 μeq/g, Mn=15,450, Tg=57.7° C., Tch=111.8° C., Tm=232.8° C.

The resulting polyether polyamide elastomer was extrusion molded at a temperature of 260° C., thereby fabricating a non-stretched film having a thickness of about 100 μm. Results obtained by evaluating tensile physical properties by using this film are shown in Table 1.

Example 1-2

In a reaction vessel having a capacity of about 3 L and equipped with a stirrer, a nitrogen gas inlet, and a condensed water discharge port, 584.60 g of adipic acid, 0.6613 g of sodium hypophosphite monohydrate, and 0.4606 g of sodium acetate were charged, and after thoroughly purging the inside of the vessel with nitrogen, the mixture was melted at 170° C. while feeding a nitrogen gas at a rate of 20 mL/min. A mixed liquid of 489.34 g of m-xylylenediamine (MXDA) (available from Mitsubishi Gas Chemical Company, Inc.) and 359.28 g of a polyether diamine (a trade name: ED-900, available from Huntsman Corporation, USA) was added dropwise thereto while gradually raising the temperature to 260° C., and the mixture was polymerized for about 2 hours to obtain a polyether polyamide elastomer: ηr=1.35, [COOH]=73.24 μeq/g, [NH2]=45.92 μeq/g, Mn=16,784, Tg=42.1° C., Tch=89.7° C., Tm=227.5° C.

The resulting polyether polyamide elastomer was extrusion molded at a temperature of 260° C., thereby fabricating a non-stretched film having a thickness of about 100 μm. Results obtained by evaluating tensile physical properties by using this film are shown in Table 1.

Example 1-3

In a reaction vessel having a capacity of about 3 L and equipped with a stirrer, a nitrogen gas inlet, and a condensed water discharge port, 584.60 g of adipic acid, 0.5523 g of sodium hypophosphite monohydrate, and 0.3847 g of sodium acetate were charged, and after thoroughly purging the inside of the vessel with nitrogen, the mixture was melted at 170° C. while feeding a nitrogen gas at a rate of 20 mL/min. A mixed liquid of 516.52 g of m-xylylenediamine (MXDA) (available from Mitsubishi Gas Chemical Company, Inc.) and 119.76 g of a polyether diamine (a trade name: ED-600, available from Huntsman Corporation, USA; according to the brochure of Huntsman Corporation, USA, in the formula (1), the round number of (x+z) is 3.0, and the round number of y is 9.0, and an approximate weight average molecular weight is 600) was added dropwise thereto while gradually raising the temperature to 260° C., and the mixture was polymerized for about 2 hours to obtain a polyether polyamide elastomer: ηr=1.49, [COOH]=76.70 μeq/g, [NH2]=43.29 μeq/g, Mn=16,669, Tg=67.1° C., Tch=125.0° C., Tm=230.5° C.

The resulting polyether polyamide elastomer was extrusion molded at a temperature of 260° C., thereby fabricating a non-stretched film having a thickness of about 100 μm. Results obtained by evaluating tensile physical properties by using this film are shown in Table 1.

Comparative Example 1-1

In a reaction vessel having a capacity of about 3 L and equipped with a stirrer, a nitrogen gas inlet, and a condensed water discharge port, 753.66 g of 12-aminolauric acid (available from Tokyo Chemical Industry Co., Ltd.), 56.84 g of adipic acid, 0.5798 g of sodium hypophosphite monohydrate, and 0.4038 g of sodium acetate were charged, and after thoroughly purging the inside of the vessel with nitrogen, the mixture was melted at 170° C. while feeding a nitrogen gas at a rate of 20 mL/min. 388.89 g of a polyether diamine (a trade name: XTJ-542, available from Huntsman Corporation, USA; according to the brochure of Huntsman Corporation, USA, the product is represented by the following formula (2), wherein the round number of (a+c) is 6.0; the round number of b is 9.0; an approximate weight average molecular weight is 1,000; and $R^2$ represents a propylene group) was added dropwise thereto while gradually raising the temperature to 240° C., and the mixture was polymerized for about 2 hours to obtain a polyether polyamide elastomer: ηr=1.25, [COOH]=87.27 μeq/g, [NH2]=73.12 μeq/g, Mn=12,470, Tm=165.0° C.

The resulting polyether polyamide elastomer was extrusion molded by using a Labo Plastomill set up at a temperature of 190° C., thereby fabricating a non-stretched film having a thickness of about 100 μm. Results obtained by evaluating tensile physical properties by using this film are shown in Table 1.

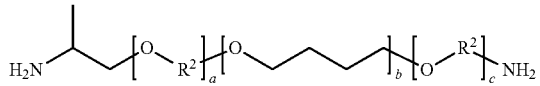

(2)

Comparative Example 1-2

In a reaction vessel having a capacity of about 3 L and equipped with a stirrer, a nitrogen gas inlet, and a condensed water discharge port, 559.86 g of 12-aminolauric acid (available from Tokyo Chemical Industry Co., Ltd.), 95.00 g of adipic acid, 0.6398 g of sodium hypophosphite monohydrate, and 0.4457 g of sodium acetate were charged, and after thoroughly purging the inside of the vessel with nitrogen, the mixture was melted at 170° C. while feeding a nitrogen gas at a rate of 20 mL/min. 650.00 g of a polyether diamine (a trade name: XTJ-542, available from Huntsman Corporation, USA) was added dropwise thereto while gradually raising the temperature to 240° C., and the mixture was polymerized for about 2 hours to obtain a polyether polyamide elastomer: $\eta r=1.25$, [COOH]=78.30 µeq/g, [NH2]=92.61 µeq/g, Mn=11,703, Tm=139.0° C.

The resulting polyether polyamide elastomer was extrusion molded by using a Labo Plastomill set up at a temperature of 190° C., thereby fabricating a non-stretched film having a thickness of about 100 µm. Results obtained by evaluating tensile physical properties by using this film are shown in Table 1.

Comparative Example 1-3

In a reaction vessel having a capacity of about 3 L and equipped with a stirrer, a nitrogen gas inlet, and a condensed water discharge port, 584.5 g of adipic acid, 0.6210 g of sodium hypophosphite monohydrate, and 0.4325 g of sodium acetate were charged, and after thoroughly purging the inside of the vessel with nitrogen, the mixture was melted at 170° C. while feeding a nitrogen gas at a rate of 20 mL/min. 544.80 g of m-xylylenediamine (MXDA) (available from Mitsubishi Gas Chemical Company, Inc.) was added dropwise thereto while gradually raising the temperature to 260° C., and the mixture was polymerized for about 2 hours to obtain a polyamide: $\eta r=2.10$, [COOH]=104.30 µeq/g, [NH2]=24.58 µeq/g, Mn=15,500, Tg=86.1° C., Tch=153.0° C., Tm=239.8° C.

The resulting polyamide was extrusion molded at a temperature of 260° C., thereby fabricating a non-stretched film having a thickness of about 100 µm. Results obtained by evaluating tensile physical properties by using this film are shown in Table 1.

Examples 2-1 to 2-3

Using a Mixture of m-Xylylenediamine and p-Xylylenediamine as the Xylylenediamine and Adipic Acid as the Dicarboxylic Acid) and Comparative Example 2-1

Example 2-1

In a reaction vessel having a capacity of about 3 L and equipped with a stirrer, a nitrogen gas inlet, and a condensed water discharge port, 657.68 g of adipic acid, 0.6572 g of sodium hypophosphite monohydrate, and 0.4578 g of sodium acetate were charged, and after thoroughly purging the inside of the vessel with nitrogen, the mixture was melted at 170° C. while feeding a nitrogen gas at a rate of 20 mL/min. A mixed liquid of 407.58 g of m-xylylenediamine (MXDA) (available from Mitsubishi Gas Chemical Company, Inc.) and 174.68 g of p-xylylenediamine (PXDA) (available from Mitsubishi Gas Chemical Company, Inc.) (molar ratio (MXDA/PXDA=70/30)) and 202.50 g of a polyether diamine (a trade name: ED-900, available from Huntsman Corporation, USA, see Example 1-1) was added dropwise thereto while gradually raising the temperature to 270° C., and the mixture was polymerized for about 2 hours to obtain a polyether polyamide elastomer: $\eta r=1.51$, [COOH]=48.53 µeq/g, [NH2]=88.72 µeq/g, Mn=14,572, Tg=59.5° C., Tch=98.0° C., Tm=249.9° C.

The resulting polyether polyamide elastomer was extrusion molded at a temperature of 270° C., thereby fabricating a non-stretched film having a thickness of about 100 µm. Results obtained by evaluating tensile physical properties by using this film are shown in Table 2.

Example 2-2

In a reaction vessel having a capacity of about 3 L and equipped with a stirrer, a nitrogen gas inlet, and a condensed water discharge port, 584.60 g of adipic acid, 0.6626 g of sodium hypophosphite monohydrate, and 0.4616 g of sodium acetate were charged, and after thoroughly purging the inside of the vessel with nitrogen, the mixture was melted at 170° C. while feeding a nitrogen gas at a rate of 20 mL/min. A mixed liquid of 343.22 g of m-xylylenediamine (MXDA) (available from Mitsubishi Gas Chemical Company, Inc.) and 147.10 g

TABLE 1

|  |  |  |  | Example | | | Comparative Example | | |
|---|---|---|---|---|---|---|---|---|---|
|  |  |  |  | 1-1 | 1-2 | 1-3 | 1-1 | 1-2 | 1-3 |
| Elastomer composition ratio (molar ratio) | Diamine | (A-1) | ED-900 | 5 | 10 | — | — | — | — |
|  |  |  | ED-600 | — | — | 5 | — | — | — |
|  |  | (A-2) | Xylylenediamine | 95 | 90 | 95 | — | — | 100 |
|  |  | (MXDA/PXDA molar ratio) |  | (100/0) | (100/0) | (100/0) | — | — | (100/0) |
|  |  | Diamine other than (A-1) and (A-2) | XTJ-542 | — | — | — | 10 | 20 | — |
|  | Dicarboxylic acid | Adipic acid |  | 100 | 100 | 100 | 10 | 20 | 100 |
|  |  | 12-Aminolauric acid |  | — | — | — | 90 | 80 | — |
| Physical properties | Glass transition temperature (° C.) |  |  | 57.7 | 42.1 | 67.1 | — | — | 86.1 |
|  | Melting point (° C.) |  |  | 232.8 | 227.5 | 230.5 | 165.0 | 139.0 | 239.8 |
|  | Relative viscosity |  |  | 1.45 | 1.35 | 1.49 | 1.25 | 1.25 | 2.10 |
|  | Rate of tensile elongation at break (%) |  |  | 241 | 341 | 214 | 513 | 656 | 2.9 |
|  | Tensile elastic modulus (MPa) |  |  | 967 | 355 | 986 | 203 | 77 | 3100 |

MXDA: m-Xylylenediamine [1,3-bis(aminomethyl)benzene]
PXDA: p-Xylylenediamine [1,4-bis(aminomethyl)benzene]

of p-xylylenediamine (PXDA) (available from Mitsubishi Gas Chemical Company, Inc.) (molar ratio (MXDA/PXDA=70/30)) and 360.00 g of a polyether diamine (a trade name: ED-900, available from Huntsman Corporation, USA) was added dropwise thereto while gradually raising the temperature to 260° C., and the mixture was polymerized for about 2 hours to obtain a polyether polyamide elastomer: ηr=1.34, [COOH]=75.95 μeq/g, [NH2]=61.83 μeq/g, Mn=14,516, Tg=33.2° C., Tch=73.9° C., Tm=246.2° C.

The resulting polyether polyamide elastomer was extrusion molded at a temperature of 270° C., thereby fabricating a non-stretched film having a thickness of about 100 μm. Results obtained by evaluating tensile physical properties by using this film are shown in Table 2.

Example 2-3

In a reaction vessel having a capacity of about 3 L and equipped with a stirrer, a nitrogen gas inlet, and a condensed water discharge port, 511.53 g of adipic acid, 0.6484 g of sodium hypophosphite monohydrate, and 0.4517 g of sodium acetate were charged, and after thoroughly purging the inside of the vessel with nitrogen, the mixture was melted at 170° C. while feeding a nitrogen gas at a rate of 20 mL/min. A mixed liquid of 283.64 g of m-xylylenediamine (MXDA) (available from Mitsubishi Gas Chemical Company, Inc.) and 121.56 g of p-xylylenediamine (PXDA) (available from Mitsubishi Gas Chemical Company, Inc.) (molar ratio (MXDA/PXDA=70/30)) and 472.50 g of a polyether diamine (a trade name: ED-900, available from Huntsman Corporation, USA) was added dropwise thereto while gradually raising the temperature to 270° C., and the mixture was polymerized for about 2 hours to obtain a polyether polyamide elastomer: ηr=1.30, [COOH]=64.58 μeq/g, [NH2]=59.15 μeq/g, Mn=16,164, Tg=27.8° C., Tch=58.8° C., Tm=240.8° C.

The resulting polyether polyamide elastomer was extrusion molded at a temperature of 270° C., thereby fabricating a non-stretched film having a thickness of about 100 μM. Results obtained by evaluating tensile physical properties by using this film are shown in Table 2.

Comparative Example 2-1

In a reaction vessel having a capacity of about 3 L and equipped with a stirrer, a nitrogen gas inlet, and a condensed water discharge port, 730.8 g of adipic acid, 0.6322 g of sodium hypophosphite monohydrate, and 0.4404 g of sodium acetate were charged, and after thoroughly purging the inside of the vessel with nitrogen, the mixture was melted at 170° C. while feeding a nitrogen gas at a rate of 20 mL/min. A mixed liquid of 476.70 g of m-xylylenediamine (MXDA) (available from Mitsubishi Gas Chemical Company, Inc.) and 204.30 g of p-xylylenediamine (PXDA) (available from Mitsubishi Gas Chemical Company, Inc.) (molar ratio (MXDA/PXDA=70/30)) was added dropwise thereto while gradually raising the temperature to 275° C., and the mixture was polymerized for about 2 hours to obtain a polyamide: ηr=2.07, [COOH]=55.70 μeq/g, [NH2]=64.58 μeq/g, Mn=16,623, Tg=89.0° C., Tch=135.0° C., Tm=257.0° C.

The resulting polyamide was extrusion molded at a temperature of 275° C., thereby fabricating a non-stretched film having a thickness of about 100 μM. Results obtained by evaluating tensile physical properties by using this film are shown in Table 2.

TABLE 2

| | | | | Example | | | Comparative Example |
|---|---|---|---|---|---|---|---|
| | | | | 2-1 | 2-2 | 2-3 | 2-1 |
| Elastomer composition ratio (molar ratio) | Diamine | (A-1) | ED-900 | 5 | 10 | 15 | — |
| | | (A-2) | Xylylenediamine (MXDA/PXDA molar ratio) | 95 (70/30) | 90 (70/30) | 85 (70/30) | 100 (70/30) |
| | Dicarboxylic acid | Adipic acid | | 100 | 100 | 100 | 100 |
| Physical properties | Glass transition temperature (° C.) | | | 59.5 | 33.2 | 27.8 | 89.0 |
| | Melting point (° C.) | | | 249.9 | 246.2 | 240.8 | 257.0 |
| | Relative viscosity | | | 1.51 | 1.34 | 1.30 | 2.07 |
| | Rate of tensile elongation at break (%) | | | 128 | 304 | 362 | 3.0 |
| | Tensile elastic modulus (MPa) | | | 1214 | 391 | 216 | 3522 |

MXDA: m-Xylylenediamine [1,3-bis(aminomethyl)benzene]
PXDA: p-Xylylenediamine [1,4-bis(aminomethyl)benzene]

Examples 3-1 to 3-13 and Comparative Examples 3-1 to 3-2

Using Sebacic Acid as the Dicarboxylic Acid

Example 3-1

In a reaction vessel having a capacity of about 3 L and equipped with a stirrer, a nitrogen gas inlet, and a condensed water discharge port, 809.00 g of sebacic acid, 0.6367 g of sodium hypophosphite monohydrate, and 0.4435 g of sodium acetate were charged, and after thoroughly purging the inside of the vessel with nitrogen, the mixture was melted at 170° C. while feeding a nitrogen gas at a rate of 20 mL/min. A mixed liquid of 539.35 g of m-xylylenediamine (MXDA) (available from Mitsubishi Gas Chemical Company, Inc.) and 36.00 g of a polyether diamine (a trade name: ED-900, available from Huntsman Corporation, USA, see Example 1-1) was added dropwise thereto while gradually raising the temperature to 260° C., and the mixture was polymerized for about 2 hours to obtain a polyether polyamide elastomer: ηr=1.81, [COOH]=83.89 μeq/g, [NH2]=40.93 μeq/g, Mn=16,024, Tg=54.0° C., Tch=103.0° C., Tm=190.7° C.

The resulting polyether polyamide elastomer was extrusion molded at a temperature of 250° C., thereby fabricating a non-stretched film having a thickness of about 100 μm. Results obtained by evaluating tensile physical properties by using this film are shown in Table 3. In addition, measurement results of a sulfur atom concentration and a YI value of the resulting polyether polyamide elastomer are shown in Table 3.

Example 3-2

In a reaction vessel having a capacity of about 3 L and equipped with a stirrer, a nitrogen gas inlet, and a condensed water discharge port, 768.55 g of sebacic acid, 0.6644 g of sodium hypophosphite monohydrate, and 0.4628 g of sodium acetate were charged, and after thoroughly purging the inside of the vessel with nitrogen, the mixture was melted at 170° C. while feeding a nitrogen gas at a rate of 20 mL/min. A mixed liquid of 491.68 g of m-xylylenediamine (MXDA) (available from Mitsubishi Gas Chemical Company, Inc.) and 171.00 g of a polyether diamine (a trade name: ED-900, available from Huntsman Corporation, USA) was added dropwise thereto while gradually raising the temperature to 260° C., and the mixture was polymerized for about 2 hours to obtain a polyether polyamide elastomer: $\eta r=1.44$, [COOH]=94.54 µeq/g, [NH2]=40.24 µeq/g, Mn=14,839, Tg=37.6° C., Tch=71.0° C., Tm=187.8° C.

The resulting polyether polyamide elastomer was extrusion molded at a temperature of 235° C., thereby fabricating a non-stretched film having a thickness of about 100 µm. Results obtained by evaluating tensile physical properties by using this film are shown in Table 3. In addition, measurement results of a sulfur atom concentration and a YI value of the resulting polyether polyamide elastomer are shown in Table 3.

Example 3-3

In a reaction vessel having a capacity of about 3 L and equipped with a stirrer, a nitrogen gas inlet, and a condensed water discharge port, 687.65 g of sebacic acid, 0.6612 g of sodium hypophosphite monohydrate, and 0.4605 g of sodium acetate were charged, and after thoroughly purging the inside of the vessel with nitrogen, the mixture was melted at 170° C. while feeding a nitrogen gas at a rate of 20 mL/min. A mixed liquid of 416.77 g of m-xylylenediamine (MXDA) (available from Mitsubishi Gas Chemical Company, Inc.) and 306.00 g of a polyether diamine (a trade name: ED-900, available from Huntsman Corporation, USA) was added dropwise thereto while gradually raising the temperature to 260° C., and the mixture was polymerized for about 2 hours to obtain a polyether polyamide elastomer: $\eta r=1.33$, [COOH]=96.88 µeq/g, [NH2]=37.00 µeq/g, Mn=14,939, Tg=22.2° C., Tch=43.0° C., Tm=182.8° C.

The resulting polyether polyamide elastomer was extrusion molded at a temperature of 220° C., thereby fabricating a non-stretched film having a thickness of about 100 µm. Results obtained by evaluating tensile physical properties by using this film are shown in Table 3. In addition, measurement results of a sulfur atom concentration and a YI value of the resulting polyether polyamide elastomer are shown in Table 3.

Example 3-4

In a reaction vessel having a capacity of about 3 L and equipped with a stirrer, a nitrogen gas inlet, and a condensed water discharge port, 626.98 g of sebacic acid, 0.6636 g of sodium hypophosphite monohydrate, and 0.4622 g of sodium acetate were charged, and after thoroughly purging the inside of the vessel with nitrogen, the mixture was melted at 170° C. while feeding a nitrogen gas at a rate of 20 mL/min. A mixed liquid of 358.89 g of m-xylylenediamine (MXDA) (available from Mitsubishi Gas Chemical Company, Inc.) and 418.50 g of a polyether diamine (a trade name: ED-900, available from Huntsman Corporation, USA) was added dropwise thereto while gradually raising the temperature to 260° C., and the mixture was polymerized for about 2 hours to obtain a polyether polyamide elastomer: $\eta r=1.27$, [COOH]=114.63 µeq/g, [NH2]=42.19 µeq/g, Mn=12,753, Tg=7.9° C., Tch=30.7° C., Tm=180.7° C.

The resulting polyether polyamide elastomer was extrusion molded at a temperature of 195° C., thereby fabricating a non-stretched film having a thickness of about 100 µm. Results obtained by evaluating tensile physical properties by using this film are shown in Table 3. In addition, measurement results of a sulfur atom concentration and a YI value of the resulting polyether polyamide elastomer are shown in Table 3.

Example 3-5

In a reaction vessel having a capacity of about 3 L and equipped with a stirrer, a nitrogen gas inlet, and a condensed water discharge port, 566.30 g of sebacic acid, 0.6543 g of sodium hypophosphite monohydrate, and 0.4557 g of sodium acetate were charged, and after thoroughly purging the inside of the vessel with nitrogen, the mixture was melted at 170° C. while feeding a nitrogen gas at a rate of 20 mL/min. A mixed liquid of 305.09 g of m-xylylenediamine (MXDA) (available from Mitsubishi Gas Chemical Company, Inc.) and 504.00 g of a polyether diamine (a trade name: ED-900, available from Huntsman Corporation, USA) was added dropwise thereto while gradually raising the temperature to 260° C., and the mixture was polymerized for about 2 hours to obtain a polyether polyamide elastomer: $\eta r=1.24$, [COOH]=141.80 µeq/g, [NH2]=83.03 µeq/g, Mn=8,895, Tm=175.5° C. In addition, measurement results of a sulfur atom concentration and a YI value of the resulting polyether polyamide elastomer are shown in Table 3.

Comparative Example 3-1

In a reaction vessel having a capacity of about 3 L and equipped with a stirrer, a nitrogen gas inlet, and a condensed water discharge port, 809.0 g of sebacic acid, 0.6210 g of sodium hypophosphite monohydrate, and 0.4325 g of sodium acetate were charged, and after thoroughly purging the inside of the vessel with nitrogen, the mixture was melted at 170° C. while feeding a nitrogen gas at a rate of 20 mL/min. 544.80 g of m-xylylenediamine (MXDA) (available from Mitsubishi Gas Chemical Company, Inc.) was added dropwise thereto while gradually raising the temperature to 260° C., and the mixture was polymerized for about 2 hours to obtain a polyamide: $\eta r=1.80$, [COOH]=88.5 µeq/g, [NH2]=26.7 µeq/g, Mn=17,300, Tg=61.2° C., Tch=114.1° C., Tm=191.5° C.

The resulting polyamide was extrusion molded at a temperature of 220° C., thereby fabricating a non-stretched film having a thickness of about 100 µm. Results obtained by evaluating tensile physical properties by using this film are shown in Table 3.

TABLE 3

|  |  |  | Example 3-1 | Example 3-2 | Example 3-3 | Example 3-4 | Example 3-5 | Comparative Example 3-1 |
|---|---|---|---|---|---|---|---|---|
| Elastomer composition ratio (molar ratio) | Diamine | (A-1) ED-900 | 1 | 5 | 10 | 15 | 20 | — |
|  |  | (A-2) Xylylenediamine (MXDA/PXDA molar ratio) | 99 (100/0) | 95 (100/0) | 90 (100/0) | 85 (100/0) | 80 (100/0) | 100 (100/0) |
|  | Dicarboxylic acid | Sebacic acid | 100 | 100 | 100 | 100 | 100 | 100 |
|  |  | Sulfur atom concentration (ppm) | 200 | 60 | 400 | 0 | 0 | — |
| Physical properties | Glass transition temperature (° C.) |  | 54.0 | 37.6 | 22.2 | 7.9 | — | 61.2 |
|  | Melting point (° C.) |  | 190.7 | 187.8 | 182.8 | 180.7 | 175.5 | 191.5 |
|  | Relative viscosity |  | 1.81 | 1.44 | 1.33 | 1.27 | 1.24 | 1.80 |
|  | Rate of tensile elongation at break (%) |  | 297 | 371 | 402 | 246 | — | 45 |
|  | Tensile elastic modulus (MPa) |  | 938 | 657 | 296 | 256 | — | 1700 |
|  | Sulfur atom concentration in elastomer (ppm) |  | 116 | 32 | 190 | 0 | 0 | — |
|  | Yellowness (YI) |  | 2.0 | 1.0 | 3.0 | 4.0 | 4.0 | — |

MXDA: m-Xylylenediamine [1,3-bis(aminomethyl)benzene]
PXDA: p-Xylylenediamine [1,4-bis(aminomethyl)benzene]

Example 3-6

In a reaction vessel having a capacity of about 3 L and equipped with a stirrer, a nitrogen gas inlet, and a condensed water discharge port, 829.23 g of sebacic acid, 0.6526 g of sodium hypophosphite monohydrate, and 0.4546 g of sodium acetate were charged, and after thoroughly purging the inside of the vessel with nitrogen, the mixture was melted at 170° C. while feeding a nitrogen gas at a rate of 20 mL/min. A mixed liquid of 386.99 g of m-xylylenediamine (MXDA) (available from Mitsubishi Gas Chemical Company, Inc.) and 165.85 g of p-xylylenediamine (PXDA) (available from Mitsubishi Gas Chemical Company, Inc.) (molar ratio (MXDA/PXDA=70/30)) and 36.90 g of a polyether diamine (a trade name: ED-900, available from Huntsman Corporation, USA) was added dropwise thereto while gradually raising the temperature to 260° C., and the mixture was polymerized for about 2 hours to obtain a polyether polyamide elastomer: $\eta r$=1.81, [COOH]=53.34 µeq/g, [NH2]=82.12 µeq/g, Mn=14,765, Tg=58.0° C., Tch=96.8° C., Tm=211.3° C.

The resulting polyether polyamide elastomer was extrusion molded at a temperature of 270° C., thereby fabricating a non-stretched film having a thickness of about 100 µm. Results obtained by evaluating tensile physical properties by using this film are shown in Table 4.

Example 3-7

In a reaction vessel having a capacity of about 3 L and equipped with a stirrer, a nitrogen gas inlet, and a condensed water discharge port, 768.55 g of sebacic acid, 0.6644 g of sodium hypophosphite monohydrate, and 0.4628 g of sodium acetate were charged, and after thoroughly purging the inside of the vessel with nitrogen, the mixture was melted at 170° C. while feeding a nitrogen gas at a rate of 20 mL/min. A mixed liquid of 344.18 g of m-xylylenediamine (MXDA) (available from Mitsubishi Gas Chemical Company, Inc.) and 47.50 g of p-xylylenediamine (PXDA) (available from Mitsubishi Gas Chemical Company, Inc.) (molar ratio (MXDA/PXDA=70/30)) and 171.00 g of a polyether diamine (a trade name: ED-900, available from Huntsman Corporation, USA) was added dropwise thereto while gradually raising the temperature to 260° C., and the mixture was polymerized for about 2 hours to obtain a polyether polyamide elastomer: $\eta r$=1.48, [COOH]=66.91 µeq/g, [NH2]=82.80 µeq/g, Mn=13,360, Tg=27.6° C., Tch=72.8° C., Tm=207.6° C.

The resulting polyether polyamide elastomer was extrusion molded at a temperature of 265° C., thereby fabricating a non-stretched film having a thickness of about 100 µM. Results obtained by evaluating tensile physical properties by using this film are shown in Table 4.

Example 3-8

In a reaction vessel having a capacity of about 3 L and equipped with a stirrer, a nitrogen gas inlet, and a condensed water discharge port, 687.65 g of sebacic acid, 0.6612 g of sodium hypophosphite monohydrate, and 0.4605 g of sodium acetate were charged, and after thoroughly purging the inside of the vessel with nitrogen, the mixture was melted at 170° C. while feeding a nitrogen gas at a rate of 20 mL/min. A mixed liquid of 291.74 g of m-xylylenediamine (MXDA) (available from Mitsubishi Gas Chemical Company, Inc.) and 125.03 g of p-xylylenediamine (PXDA) (available from Mitsubishi Gas Chemical Company, Inc.) (molar ratio (MXDA/PXDA=70/30)) and 306.00 g of a polyether diamine (a trade name: ED-900, available from Huntsman Corporation, USA) was added dropwise thereto while gradually raising the temperature to 260° C., and the mixture was polymerized for about 2 hours to obtain a polyether polyamide elastomer: $\eta r$=1.36, [COOH]=66.35 µeq/g, [NH2]=74.13 µeq/g, Mn=14,237, Tg=16.9° C., Tch=52.9° C., Tm=201.9° C.

The resulting polyether polyamide elastomer was extrusion molded at a temperature of 250° C., thereby fabricating a non-stretched film having a thickness of about 100 µm. Results obtained by evaluating tensile physical properties by using this film are shown in Table 4.

Example 3-9

In a reaction vessel having a capacity of about 3 L and equipped with a stirrer, a nitrogen gas inlet, and a condensed water discharge port, 626.98 g of sebacic acid, 0.6636 g of sodium hypophosphite monohydrate, and 0.4622 g of sodium acetate were charged, and after thoroughly purging the inside of the vessel with nitrogen, the mixture was melted at 170° C. while feeding a nitrogen gas at a rate of 20 mL/min. A mixed liquid of 251.22 g of m-xylylenediamine (MXDA) (available from Mitsubishi Gas Chemical Company, Inc.) and 107.67 g of p-xylylenediamine (PXDA) (available from Mitsubishi Gas Chemical Company, Inc.) (molar ratio (MXDA/PXDA=70/30)) and 418.50 g of a polyether diamine (a trade name: ED-900, available from Huntsman Corporation, USA) was added dropwise thereto while gradually raising the temperature to 260° C., and the mixture was polymerized for about 2 hours to obtain a polyether polyamide elastomer: ηr=1.30, [COOH]=68.12 μeq/g, [NH2]=70.55 μeq/g, Mn=14,423, Tg=6.7° C., Tch=34.7° C., Tm=196.9° C.

The resulting polyether polyamide elastomer was extrusion molded at a temperature of 245° C., thereby fabricating a non-stretched film having a thickness of about 100 μm. Results obtained by evaluating tensile physical properties by using this film are shown in Table 4.

Example 3-10

In a reaction vessel having a capacity of about 3 L and equipped with a stirrer, a nitrogen gas inlet, and a condensed water discharge port, 566.30 g of sebacic acid, 0.6543 g of sodium hypophosphite monohydrate, and 0.4557 g of sodium acetate were charged, and after thoroughly purging the inside of the vessel with nitrogen, the mixture was melted at 170° C. while feeding a nitrogen gas at a rate of 20 mL/min. A mixed liquid of 213.56 g of m-xylylenediamine (MXDA) (available from Mitsubishi Gas Chemical Company, Inc.) and 91.53 g of p-xylylenediamine (PXDA) (available from Mitsubishi Gas Chemical Company, Inc.) (molar ratio (MXDA/PXDA=70/30)) and 504.00 g of a polyether diamine (a trade name: ED-900, available from Huntsman Corporation, USA) was added dropwise thereto while gradually raising the temperature to 260° C., and the mixture was polymerized for about 2 hours to obtain a polyether polyamide elastomer: ηr=1.27, [COOH]=75.93 μeq/g, [NH2]=70.67 μeq/g, Mn=13,643, Tch=24.9° C., Tm=190.9° C.

Example 3-11

In a reaction vessel having a capacity of about 3 L and equipped with a stirrer, a nitrogen gas inlet, and a condensed water discharge port, 829.23 g of sebacic acid, 0.6414 g of sodium hypophosphite monohydrate, and 0.4468 g of sodium acetate were charged, and after thoroughly purging the inside of the vessel with nitrogen, the mixture was melted at 170° C. while feeding a nitrogen gas at a rate of 20 mL/min. A mixed liquid of 388.94 g of m-xylylenediamine (MXDA) (available from Mitsubishi Gas Chemical Company, Inc.) and 166.69 g of p-xylylenediamine (PXDA) (available from Mitsubishi Gas Chemical Company, Inc.) (molar ratio (MXDA/PXDA=70/30)) and 12.30 g of a polyether diamine (a trade name: ED-600, available from Huntsman Corporation, USA, see Example 1-3) was added dropwise thereto while gradually raising the temperature to 260° C., and the mixture was polymerized for about 2 hours to obtain a polyether polyamide elastomer: ηr=1.87, [COOH]=38.27 μeq/g, [NH2]=90.10 μeq/g, Mn=15,579, Tg=62.1° C., Tch=101.2° C., Tm=211.8° C.

The resulting polyether polyamide elastomer was extrusion molded at a temperature of 260° C., thereby fabricating a non-stretched film having a thickness of about 100 μm. Results obtained by evaluating tensile physical properties by using this film are shown in Table 4.

Example 3-12

In a reaction vessel having a capacity of about 3 L and equipped with a stirrer, a nitrogen gas inlet, and a condensed water discharge port, 829.23 g of sebacic acid, 0.6463 g of sodium hypophosphite monohydrate, and 0.4502 g of sodium acetate were charged, and after thoroughly purging the inside of the vessel with nitrogen, the mixture was melted at 170° C. while feeding a nitrogen gas at a rate of 20 mL/min. A mixed liquid of 386.99 g of m-xylylenediamine (MXDA) (available from Mitsubishi Gas Chemical Company, Inc.) and 165.85 g of p-xylylenediamine (PXDA) (available from Mitsubishi Gas Chemical Company, Inc.) (molar ratio (MXDA/PXDA=70/30)) and 24.60 g of a polyether diamine (a trade name: ED-600, available from Huntsman Corporation, USA) was added dropwise thereto while gradually raising the temperature to 260° C., and the mixture was polymerized for about 2 hours to obtain a polyether polyamide elastomer: ηr=1.86, [COOH]=36.13 μeq/g, [NH2]=94.50 Mn=15,310, Tg=60.4° C., Tch=99.0° C., Tm=211.7° C.

The resulting polyether polyamide elastomer was extrusion molded at a temperature of 260° C., thereby fabricating a non-stretched film having a thickness of about 100 μm. Results obtained by evaluating tensile physical properties by using this film are shown in Table 4.

Example 3-13

In a reaction vessel having a capacity of about 3 L and equipped with a stirrer, a nitrogen gas inlet, and a condensed water discharge port, 728.10 g of sebacic acid, 0.6446 g of sodium hypophosphite monohydrate, and 0.4490 g of sodium acetate were charged, and after thoroughly purging the inside of the vessel with nitrogen, the mixture was melted at 170° C. while feeding a nitrogen gas at a rate of 20 mL/min. A mixed liquid of 308.90 g of m-xylylenediamine (MXDA) (available from Mitsubishi Gas Chemical Company, Inc.) and 132.39 g of p-xylylenediamine (PXDA) (available from Mitsubishi Gas Chemical Company, Inc.) (molar ratio (MXDA/PXDA=70/30)) and 216.00 g of a polyether diamine (a trade name: ED-600, available from Huntsman Corporation, USA) was added dropwise thereto while gradually raising the temperature to 260° C., and the mixture was polymerized for about 2 hours to obtain a polyether polyamide elastomer: ηr=1.36, [COOH]=33.90 μeq/g, [NH2]=102.39 μeq/g, Mn=14,675, Tg=26.8° C., Tch=67.8° C., Tm=202.1° C.

The resulting polyether polyamide elastomer was extrusion molded at a temperature of 250° C., thereby fabricating a non-stretched film having a thickness of about 100 μm. Results obtained by evaluating tensile physical properties by using this film are shown in Table 4.

Comparative Example 3-2

In a reaction vessel having a capacity of about 3 L and equipped with a stirrer, a nitrogen gas inlet, and a condensed water discharge port, 829.2 g of sebacic acid, 0.6365 g of sodium hypophosphite monohydrate, and 0.4434 g of sodium acetate were charged, and after thoroughly purging the inside of the vessel with nitrogen, the mixture was melted at 170° C. while feeding a nitrogen gas at a rate of 20 mL/min. A mixed liquid of 390.89 g of m-xylylenediamine (MXDA) (available from Mitsubishi Gas Chemical Company, Inc.) and 167.53 g of p-xylylenediamine (PXDA) (available from Mitsubishi Gas Chemical Company, Inc.) (molar ratio (MXDA/PXDA=70/30)) was added dropwise thereto while gradually raising the temperature to 260° C., and the mixture was polymerized for about 2 hours to obtain a polyamide: ηr=2.20, [COOH]=81.8 μeq/g, [NH2]=26.9 μeq/g, Mn=18,400, Tg=65.9° C., Tch=100.1° C., Tm=213.8° C.

The resulting polyamide was extrusion molded at a temperature of 240° C., thereby fabricating a non-stretched film having a thickness of about 100 μm. Results obtained by evaluating tensile physical properties by using this film are shown in Table 4.

TABLE 4

|  |  |  |  | Example | | | | | Comparative Example | Example | | |
|---|---|---|---|---|---|---|---|---|---|---|---|---|
|  |  |  |  | 3-6 | 3-7 | 3-8 | 3-9 | 3-10 | 3-2 | 3-11 | 3-12 | 3-13 |
| Elastomer composition ratio (molar ratio) | Diamine | (A-1) | ED-900 | 1 | 5 | 10 | 15 | 20 | — | — | — | — |
|  |  |  | ED-600 | — | — | — | — | — | — | 0.5 | 1 | 10 |
|  |  | (A-2) | Xylylenediamine (MXDA/PXDA molar ratio) | 99 (70/30) | 95 (70/30) | 90 (70/30) | 85 (70/30) | 80 (70/30) | 100 (70/30) | 99.5 (70/30) | 99 (70/30) | 90 (70/30) |
|  | Dicarboxylic acid | Sebacic acid |  | 100 | 100 | 100 | 100 | 100 | 100 | 100 | 100 | 100 |
| Physical properties | Glass transition temperature (° C.) |  |  | 58.0 | 27.6 | 16.9 | 6.7 | — | 65.9 | 62.1 | 60.4 | 26.8 |
|  | Melting point (° C.) |  |  | 211.3 | 207.6 | 201.9 | 196.9 | 190.9 | 213.8 | 211.8 | 211.7 | 202.1 |
|  | Relative viscosity |  |  | 1.81 | 1.48 | 1.36 | 1.30 | 1.27 | 2.20 | 1.87 | 1.86 | 1.36 |
|  | Rate of tensile elongation at break (%) |  |  | 369 | 387 | 393 | 418 | — | 3.4 | 247.9 | 222.3 | 318.3 |
|  | Tensile elastic modulus (MPa) |  |  | 1289 | 766 | 319 | 229 | — | 2030 | 1891 | 1496 | 548 |

MXDA: m-Xylylenediamine [1,3-bis(aminomethyl)benzene]
PXDA: p-Xylylenediamine [1,4-bis(aminomethyl)benzene]

From the results shown in Tables 1 to 4, it is noted that the polyether polyamide elastomer of the present invention is a material which is excellent in terms of all of melt moldability, crystallinity, flexibility, mechanical strength, and heat resistance.

INDUSTRIAL APPLICABILITY

The polyether polyamide elastomer of the present invention is a novel polyether polyamide elastomer which is excellent in terms of melt moldability, crystallinity, flexibility, toughness, and the like and also excellent in terms of heat resistance and can be used for various industrial parts, gear connectors of mechanical and electrical precision instruments, fuel tubes around an automobile engine, connector parts, sliding parts, belts, hoses, electric and electronic parts such as silent gears, etc., sporting goods, and the like.

The invention claimed is:

1. A polyether polyamide elastomer comprising:
a diamine constituent unit derived from a polyether diamine compound (A-1) represented by formula (1) and a xylylenediamine (A-2), and
a dicarboxylic acid constituent unit derived from an α,ω-linear aliphatic dicarboxylic acid having a carbon number of 4 to 20:

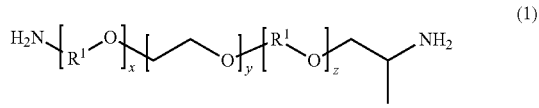

(1)

wherein a sum of x+z is 1 to 6.0; y is 1 to 12.5; and $R^1$ represents a propylene group.

2. The polyether polyamide elastomer according to claim 1, wherein the xylylenediamine (A-2) is m-xylylenediamine, p-xylylenediamine, or a mixture thereof.

3. The polyether polyamide elastomer according to claim 1, wherein the xylylenediamine (A-2) is m-xylylenediamine.

4. The polyether polyamide elastomer according to claim 1, wherein the xylylenediamine (A-2) is a mixture of m-xylylenediamine and p-xylylenediamine.

5. The polyether polyamide elastomer according to claim 4, wherein a proportion of the p-xylylenediamine relative to a total amount of m-xylylenediamine and p-xylylenediamine is 90% by mole or less.

6. The polyether polyamide elastomer according to claim 1, wherein the α,ω-linear aliphatic dicarboxylic acid is at least one member selected from the group consisting of adipic acid and sebacic acid.

7. The polyether polyamide elastomer according to claim 1, wherein a proportion of the constituent unit derived from the xylylenediamine (A-2) in the diamine constituent unit is in a range of 50 to 99.9% by mole.

8. The polyether polyamide elastomer according to claim 1, wherein a relative viscosity of the polyether polyamide elastomer is 1.1 to 3.0.

9. The polyether polyamide elastomer according to claim 1, wherein a melting point of the polyether polyamide elastomer is 170 to 270° C.

10. The polyether polyamide elastomer according to claim 1, wherein a rate of tensile elongation at break of the polyether polyamide elastomer at a measurement temperature of 23° C. and a humidity of 50% RH is 100% or more.

11. The polyether polyamide elastomer according to claim 1, wherein the α,ω-linear aliphatic dicarboxylic acid is adipic acid.

12. The polyether polyamide elastomer according to claim 1, wherein the α,ω-linear aliphatic dicarboxylic acid is sebacic acid.

13. The polyether polyamide elastomer according to claim 5, wherein the α,ω-linear aliphatic dicarboxylic acid is at least one member selected from the group consisting of adipic acid and sebacic acid.

14. The polyether polyamide elastomer according to claim 7, wherein the α,ω-linear aliphatic dicarboxylic acid is at least one member selected from the group consisting of adipic acid and sebacic acid.

15. The polyether polyamide elastomer according to claim 8, wherein the α,ω-linear aliphatic dicarboxylic acid is at least one member selected from the group consisting of adipic acid and sebacic acid.

16. The polyether polyamide elastomer according to claim 9, wherein the α,ω-linear aliphatic dicarboxylic acid is at least one member selected from the group consisting of adipic acid and sebacic acid.

17. The polyether polyamide elastomer according to claim 8, wherein a proportion of the constituent unit derived from the xylylenediamine (A-2) in the diamine constituent unit is in a range of 50 to 99.9% by mole.

18. The polyether polyamide elastomer according to claim 1, wherein a concentration of a phosphorus atom in the polyether polyamide elastomer is 1 to 1000 ppm.

19. The polyether polyamide elastomer according to claim 18, wherein the polyether polyamide elastomer is manufactured by a melt polycondensation method upon addition of a phosphorus atom-containing compound, reacting a diamine component comprising the polyether diamine compound (A-1) and the xylylenediamine (A-2) with a dicarboxylic acid component comprising the $\alpha,\omega$-linear aliphatic dicarboxylic acid having a carbon number of from 4 to 20.

20. The polyether polyamide elastomer according to claim 19, wherein an alkali metal compound is added in combination with the phosphorus atom-containing compound.

* * * * *